(No Model.)
J. M. PROCTOR.
GATE OR DOOR HOOK.
No. 572,446.  Patented Dec. 1, 1896.
Fig. I.
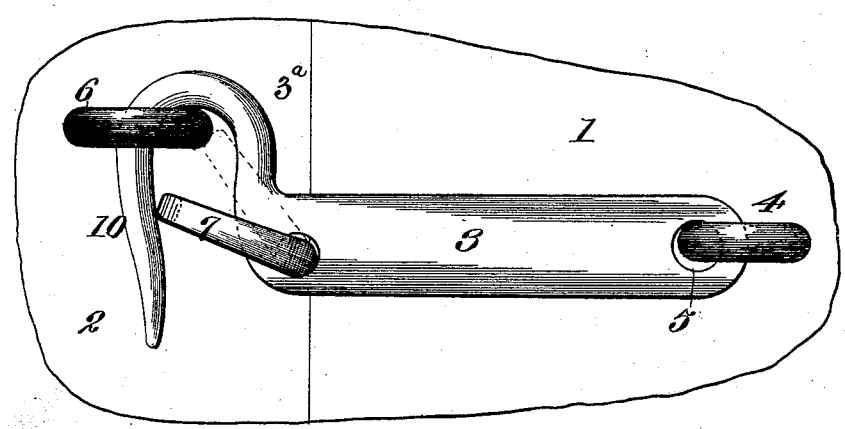
Fig. II.
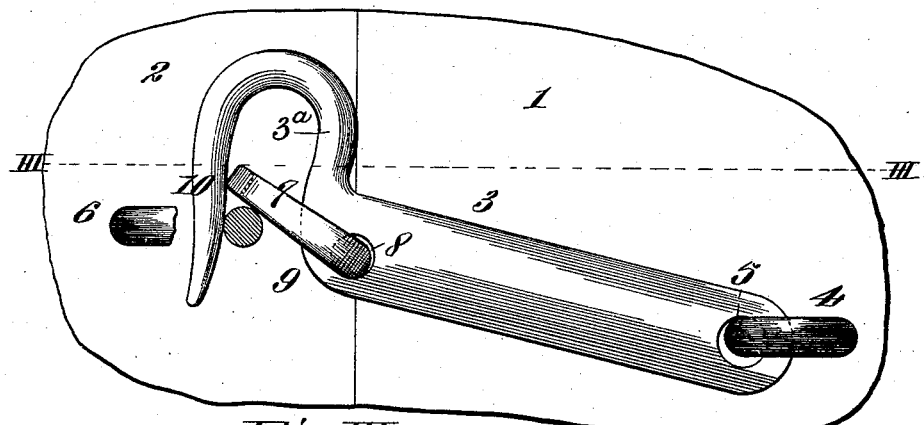
Fig. III.
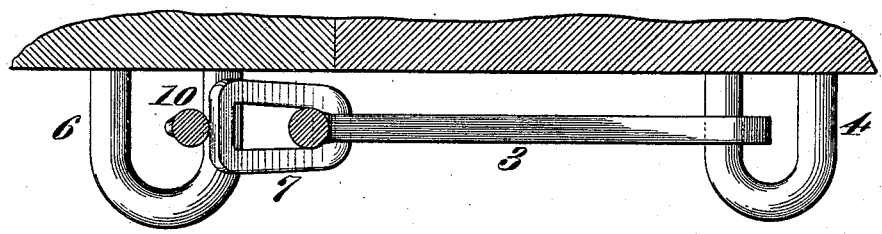
Attest:
E. K. Knight
N. Finley
Inventor:
J. M. Proctor
By Knight Bro.
atty's

UNITED STATES PATENT OFFICE.

JAMES M. PROCTOR, OF STURGEON, MISSOURI.

GATE OR DOOR HOOK.

SPECIFICATION forming part of Letters Patent No. 572,446, dated December 1, 1896.

Application filed May 18, 1896. Serial No. 591,948. (No model.)

*To all whom it may concern:*

Be it known that I, JAMES M. PROCTOR, a citizen of the United States, and a resident of Sturgeon, in the county of Boone and State of Missouri, have invented a certain new and useful Improvement in Gate or Door Hooks, of which the following is a full, clear, and exact description, reference being had to the accompanying drawings, forming part of this specification.

My invention relates to an improved hook for gates and doors, the object of my invention being to provide such a hook as cannot be unfastened by an animal rubbing against the hook, and at the same time provide for the easy operation of the hook in fastening and unfastening the gate or door.

My invention consists in features of novelty hereinafter fully described, and pointed out in the claim.

Figure I is a side elevation of my improved hook. Fig. II is a similar view illustrating the operation of the hook. Fig. III is a section taken on line III III, Fig. II.

Referring to the drawings, 1 represents part of a door or gate, and 2 part of a gate-post or door-jamb.

3 represents the straight arm of the hook, connected, as usual, to the gate or door by means of a fixed pivot in the form of staple 4, passed through an eye 5 in one end of the arm.

6 represents a staple driven into the gate-post or door-jamb, and which is designed to receive the free end or point of the U-shaped head 3ª of the hook, the head 3ª being located approximately at right angles to the arm.

7 represents a link fitting in an eye 8, made in the inner end of the hook at the bend or corner 9. This link is of sufficient length as to rest against the free end point 10 of the hook above the line of the eye 8, so that the link will, when in normal position, rest at an inclination as shown in Figs. I and II. As the hook is made to engage the staple 6, the link 7 will swing up toward the position shown in dotted lines, Fig. I, and as the hook fully engages the staple the link drops down into the position shown in full lines, Fig. I, so that any attempt to lift the hook without raising the link cannot result in the unfastening of the gate or door—as, for instance, should an animal press upward against the hook with its nose the link will prevent the hook from being disengaged from the staple.

By connecting the link to the head of the hook at the bend or corner 9 of the latter the link does not interfere with the entrance of the point of the hook into the staple, as the link offers no obstruction to the point of the hook, and thus the staples 4 and 6 may be set sufficiently far apart as to cause the point of the hook to engage the inner side of the staple 6, as shown in Fig. II, so that when the hook is in closed position there will be but little lost motion between the hook and the staple.

Another advantage of pivoting the link to the end 9 of the staple is that in unfastening the gate or door the person can press with his fingers against the link and raise its free end, and by a further pressure without removing the fingers from the link can disconnect the hook from the staple 6.

Still another advantage arising from pivoting the link to the hook at the bend or corner 9 is that it does not in any manner result in the weakening or necessitate the enlarging the point of the hook, as it would were the link pivoted to the point and allowed to rest with its free end against the inner bend of the hook.

A hook thus formed effectually performs the functions for which it is intended. There is nothing about it to get out of order and it is inexpensive.

I claim as my invention—

A hook for gates and doors composed of an arm 3 having a perforated corner 9, a gooseneck-head 3ª projecting from the upper corner of the free end of the arm, and a link 7 fitting in the perforation of the corner 9 and the free end of which is adapted to rest against the outer arm of the gooseneck-head when the link is in its normal position; said link being shorter than the distance between said perforation and the top of the gooseneck-head, whereby when said head is made to engage a staple the free end of the link will swing upwardly away from the outer arm of the gooseneck-head and then drop again, when it passes the staple, against the outer arm of the head, substantially as set forth.

JAMES M. PROCTOR.

In presence of—
C. E. KEITHLY,
J. V. KEMPER.